July 25, 1961   A. C. SAMPIETRO ET AL   2,994,026
SINGLE TRANSISTOR D.C. TO A.C. CONVERTER FOR MOTORS
Filed Jan. 28, 1959                           2 Sheets-Sheet 1

Inventors
Achilles C. Sampietro
John D. Grigsby
by Hill, Sherman, Meroni, Gross & Simpson   Attys.

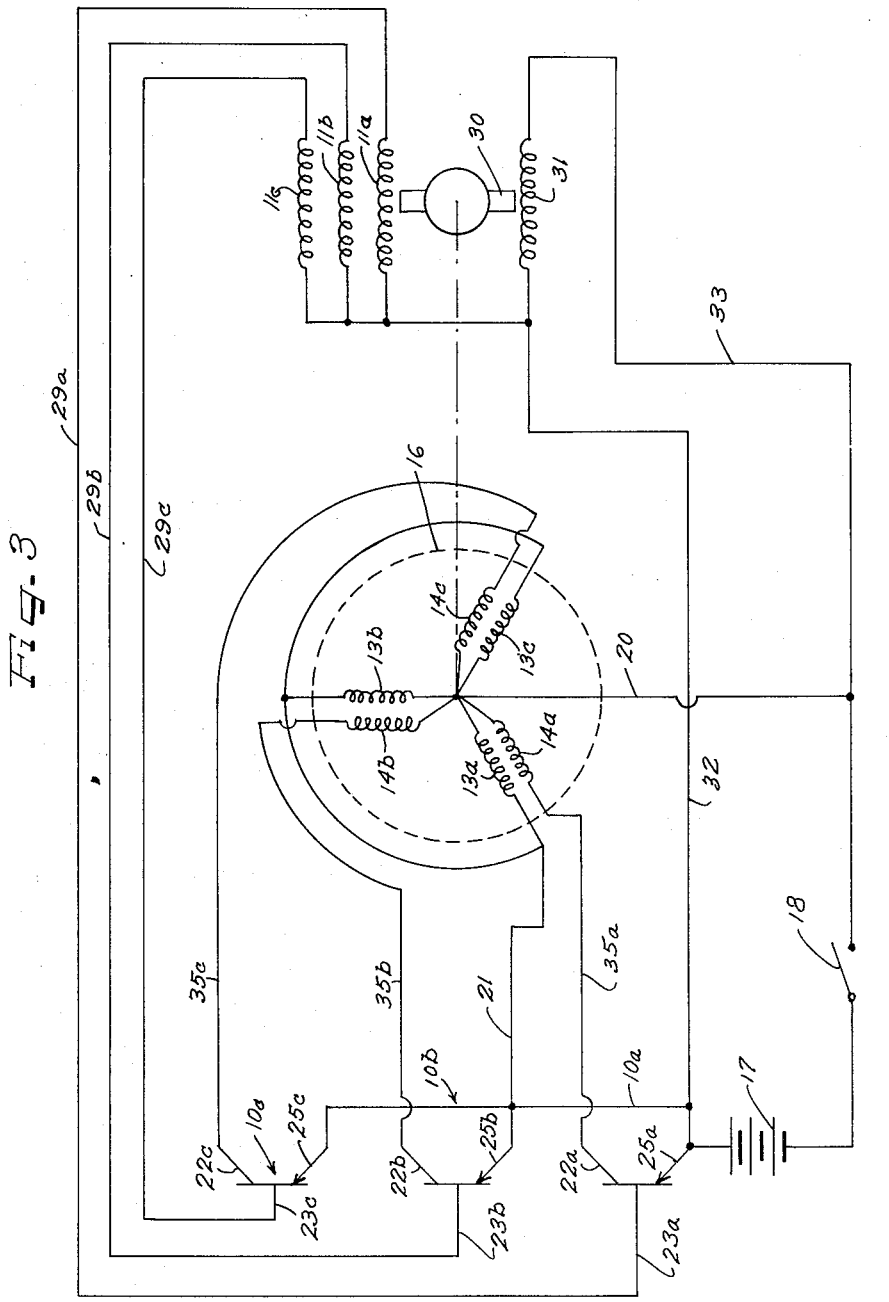

United States Patent Office 2,994,026
Patented July 25, 1961

2,994,026
SINGLE TRANSISTOR D.C. TO A.C. CONVERTER FOR MOTORS

Achilles C. Sampietro, Birmingham, Mich., and John D. Grigsby, Willoughby, Ohio, assignors to Thompson Ramo Wooldridge Inc., Cleveland, Ohio, a corporation of Ohio
Filed Jan. 28, 1959, Ser. No. 789,601
10 Claims. (Cl. 318—225)

This invention relates to apparatus for operating alternating current motors from a unidirectional voltage source. More particularly, this invention relates to electrical circuitry utilizing a single transistor per phase of the electrical motor to convert electrical power from a unidirectional voltage source to alternating current power suitable for operating the motor.

Numerous circuits have in the past been devised for converting a unidirectional or direct current voltage to an alternating current or voltage. Each of these known circuits is in general particularly adapted to a certain type or class of loads having different impedance and power requirements. It is a feature of the present circuit to provide a simple, economical, and efficient circuit utilizing the field coil windings and rotor of a conventional alternating current motor as an integral part of a circuit for converting electrical energy from a unidirectional voltage source to alternating current energy suitable to actuate the motor.

It is therefore an object of this invention to provide an electrical circuit for converting unidirectional to alternating current electrical energy for operating motors.

It is a further object of this invention to provide such a circuit which uses only a single transistor per phase of the motor.

It is a further object of this invention to provide such apparatus which is simple and inexpensive to manufacture and yet which is efficient and reliable in operation.

Other objects, features, and advantages of the present invention will be more fully apparent to those skilled in the art from the following detailed description taken in connection with the accompanying drawings in which like reference characters refer to like parts throughout and wherein.

FIGURE 3 is a circuit diagram showing the application of the embodiment of FIGURE 2 to a three-phase motor.

Figure 1:
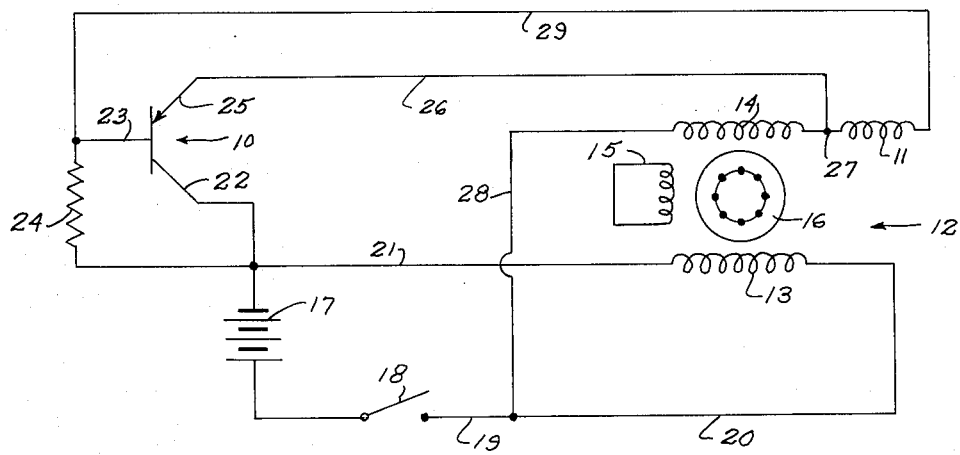
FIGURE 1 is a schematic circuit diagram showing the converter used with a single phase motor.

In FIGURE 1, there is shown a converter circuit wherein a transistor 10 is triggered or cyclically biased to alternatively conductive and non-conductive states by voltages induced in an auxiliary control coil or winding 11 associated with a motor 12. This switching action is used to convert unidirectional to alternating electrical energy as will be apparent from the following discussion.

The motor 12 with which the circuit is used may be any type of alternating current motor having field coil windings 13 and 14 respectively and a quadrature winding 15 which gives the usual quadrature flux to produce a rotating field which rotates the rotor 16. Motor 12 may, for example, be of the squirrel cage or induction type.

Power for operating the motor is derived from a battery or other source 17 of unidirectional voltage. The positive terminal of battery 17 is connected through a start-stop switch 18 and conductors 19 and 20 to one end of a first of the field coil windings 13. The other end of field coil winding 13 is connected by conductor 21 to the negative side of battery 17. Thus, when the switch 18 is closed in order to operate the motor, the winding 13, which may be called the D.C. winding generates a magneto motive force having a magnitude of +NI, where N is the number of turns in the coil and I is the current through the coil.

The negative side of battery 17 is also connected to the collector 22 of transistor 10 which in the example shown would therefore be a P-N-P transistor. It will, of course, be understood that an N-P-N transistor could also be used simply by reversing the polarity of the battery. In any event, it is preferred to use a junction transistor of sufficient power handling capacity to accommodate the motor load and of sufficiently rapid response time to switch at a rate determined by the desired frequency of operation.

The base electrode 23 of transistor 10 is connected through a resistor or resistive impedance 24 back to the collector electrode 22 and negative terminal of battery 17 to afford a starting bias for the circuit, that is to say, to provide an initial starting pulse of current through the control or triggering coil 11 when switch 18 is first closed.

The emitter electrode 25 of transistor 10 is connected by a conductor 26 to the junction point 27 between coils 11 and 14. The other end of coil 14 is connected by a conductor 28 back to conductor 19, switch 18, and the positive side of battery 17. The other end of the control winding 11 is connected by a conductor 29 back to the base electrode 23 of transistor 10.

In operation, the direct current winding 13 generates a magneto motive force having a magnitude of +NI whereas the transistor controlled winding 14, the other field winding of the motor 12, generates a magneto motive force of —2NI after a time $t$ which is required for the flux in coil 14 to rise from a zero value to this maximum value during each cycle. The length of the time $t$ is of course determined by the frequency of triggering of the transistor 10 which in turn is determined by the overall circuit characteristics. It will be noted that the direction of the current flow from battery 17 through the two field windings 13 and 14 is opposite and hence these two field windings will generate flux components which respectively have opposite directions and will subtract from each other in terms of their total effect on the rotor 16. The total flux will then vary between $\phi$ and $-\phi$ since the flux in coil 13 has a constant fixed value of +NI and the flux in coil 14 varies cyclically between zero and —2NI. When the flux in coil 14 reaches its maximum value of —2NI, the voltage induced in control winding 11 which is connected as a feedback coil to bias the base electrode 23 of the transistor will reverse polarity because of the change of sign of $d\phi/dt$ and bias the transistor to a non-conducting state and thereby shut off the current through the alternating current field winding coil 14. This, of course, results from the fact that the coil 14 is connected in series circuit relationship with the battery 17 through the collector emitter circuit of the transistor 10. The proper choice of the number of turns for coil 11 to achieve the desired biasing action is of course determined by the characteristics of the particular transistor used. The resistor 24 applies a component of bias to the base electrode of the transistor to insure starting when the switch 18 is closed. The coil 15 is the conventional quadrature coil which gives the quadrature flux to produce a rotating field to drag the rotor 16 and hence operate the motor. It will also be apparent that essentially the same circuit can be extended for use with multi-phase motor circuits by providing one additional transistor for each additional phase.

Figure 2:
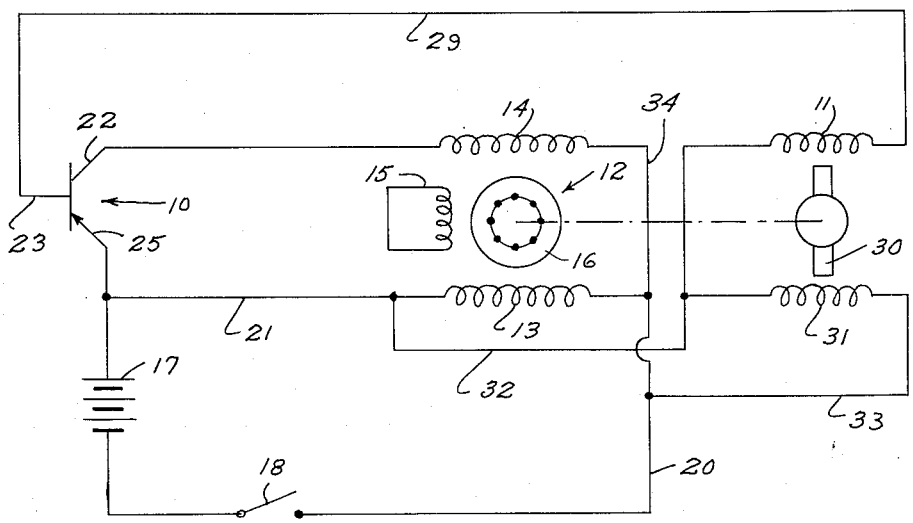
FIGURE 2 is a circuit diagram showing a second embodiment of the converter circuit also used with a single phase motor.

In the embodiment shown in FIGURE 1, the control bias voltage is induced in the control coil 11 by the magnetic flux generated by eddy currents in the rotor 16. In certain applications and for certain types of motors it may be more convenient to provide an independent means for inducing the control voltage. As shown in FIGURE 2, this may be accomplished by the rotation of a shuttle 30 attached to or driven by the rotor 16 as indicated by the dash line in FIGURE 2. In most other respects, the circuit of FIGURE 2 is quite similar to that of FIGURE 1 and corresponding parts have been indicated by like reference characters and will not be further described.

It should, however, be noted taht an additional coil 31 is connected in parallel with the direct current field winding coil 13 of motor 12 and is positioned in inductively coupled relationship with the shuttle 13 to supply the magnetomotive power which induces control voltages in winding 11 as the shuttle 30 is rotated by the motor 12. Coil 31 is connected at one end by a conductor 32 to the conductor 21 which connects one end of coil 13 to the positive terminal of battery 17. Coil 31 is connected at the other end by a conductor 33 to conductor 20 which connects the other end of coil 13 to the other terminal of battery 17. The two coils 13 and 31 are thus connected in parallel across battery 17.

It will also be noted that the polarity of battery 17 as shown in FIGURE 2 is the opposite from that shown in FIGURE 1 and that the emitter and collector electrodes of transistor 10 have been interchanged thereby providing an entirely equivalent circuit which would also use a P-N-P transistor.

As shown in FIGURE 2, one end of the alternating current coil 14 is connected by conductor 34 to conductor 20 and thence through switch 18 to the negative terminal of battery 17. The positive terminal of battery 17 is connected through emitter 25 and collector 22 to conductor 35 and thence to the other end of coil 14. Current will therefore flow through the coil 14 only when the transistor 10 is in a conductive state and the magnitude of this current will be controlled by the bias of the transistor. The coil 13, on the other hand, is directly connected across the battery 17 by conductors 21, 20 and switch 18 and will maintain a constant flux having a magnitude of +NI as in the embodiment of FIGURE 1. For the reasons noted above, the flux in coil 14 will vary from zero to −2NI so that again, the total flux through the rotor will vary from +φ to −φ. The voltage induced in coil 11 as the shuttle 30 is rotated by the motor cyclically biases the transistor 10 to alternate conductive and non-conductive states in substantially the same manner discussed in connection with the embodiment of FIGURE 1. When the total flux reaches the value of −φ, the current through the transistor and hence through coil 14 is cut off by the action of the rotating shuttle 30 which may be a piece of soft steel mounted on the shaft of motor 12. The current is re-established after the shuttle has turned by a predetermined angle, the magnitude of which of course depends upon the coil 11 and the characteristics of the transistor 10. In the embodiment of FIGURE 2, the biasing resistor has been omitted and when the circuit is started a current impulse is applied to trigger the transistor for the first time. This may be done in any convenient manner, or alternatively, the biasing resistor may be used in the manner shown in FIGURE 1. Once started, the motor and the current remain in synchronism.

In FIGURE 3, there is shown a schematic circuit diagram showing how the embodiment of FIGURE 2 can be connected for use in a three-phase circuit. Of course, it will be understood that the embodiment of FIGURE 1 can also be extended in the same manner and that either embodiment can be extended for use with motors of any desired number of phases. The showing in FIGURE 3 should therefore be understood to be illustrative only.

In FIGURE 3 like reference characters have been used to indicate corresponding parts already described in connection with FIGURE 2 and where a plurality of similar parts is required in order to accommodate the three-phase characteristics the additional parts have been indicated by the same reference character followed by letters $a$, $b$, $c$, for the three phases respectively. From a comparison of FIGURES 2 and 3, it will be noted that the circuit of FIGURE 3 is a straightforward extension of the circuit of FIGURE 2 using one transistor per phase. For convenience in illustration, the rotor 16 has been indicated by the dash dot line in FIGURE 3. It will, however, be understood that a conventional three-phase winding pattern for the motor is intended. Similarly, the control coils 11$a$, 11$b$ and 11$c$ in FIGURE 3 have been shown adjacent each other and positioned in inductively coupled relationship to the shuttle 30. It will, of course, be understood that these coils are so positioned with respect to the rotating shuttle that voltages which are 120° out of phase with each other are induced in them respectively. The showing in FIGURE 3 is used for convenience of illustration only.

In operation, each phase of the circuit of FIGURE 3 operates in the same manner as the single phase circuit shown in FIGURE 2. Of course, the winding of the motor field coils and the positioning of the control coils 11$a$, 11$b$ and 11$c$ is such as to insure the desired relationship between the phases so that the three transistors are respectively triggered at intervals which are 120° delayed with respect to each other. The single phase circuit of FIGURE 2 is thus extended by the connections shown in FIGURE 3 to provide a converter circuit for a three-phase motor. As noted above, it will of course be understood that any desired number of phases could be used with either the circuit arrangement of FIGURES 1 or 2. It will of course also be understood that by using only a single mesh, it is also possible to operate a many phase motor with only one transistor.

While a particular exemplary preferred embodiment of the invention has been described in detail above, it will be understood that modifications and variations therein may be effected without departing from the true spirit and scope of the novel concepts of the present invention as defined by the following claims.

We claim as our invention:

1. Apparatus for supplying operating power from a source of unidirectional voltage to an alternating current motor having a rotor and first and second field coil windings comprising, a transistor, means connecting a first of said field windings directly across said unidirectional source of voltage to generate a first flux component having a first direction, means connecting a second of said field windings in series with said transistor and said unidirectional source of voltage to generate a second flux component having a second direction opposite to said first direction, said first and second field windings being positioned so that said first and second flux components subtract from each other, and a control winding positioned and connected to be responsive to the rotation of said rotor to cyclically bias said transistor to alternate conductive and non-conductive states.

2. Apparatus for supplying operating power from a source of unidirectional voltage to an alternating current motor having a rotor and first and second field windings comprising, a transistor having emitter, base, and collector electrodes, means connecting a first of said field windings directly across said unidirectional source to generate a first flux component having a first direction, means connecting a second of said field windings in series with said transistor and said unidirectional source of voltage to generate a second flux component having a second direction opposite to said first direction, said first and second field coils being positioned so that said first and second flux components subtract from each other, a control winding connected in circuit between said base electrode and one other electrode of said transistor, and means comprising said rotor to induce cyclic voltages in said control winding to cyclically bias said transistor to alternate conductive and non-conductive states.

3. Apparatus for supplying operating power from a source of unidirectional voltage to an alternating current motor having a rotor and first and second field windings comprising, a transistor having emitter, base, and collector electrodes, means connecting a first of said field windings directly across said unidirectional source to generate a first flux component having a first direction, means connecting a second of said field windings in series circuit relationship with the emitter-collector circuit of said transistor and with said unidirectional source of voltage to generate a second flux component having a second direction opposite to said first direction, said first and second field windings being positioned so that said first and second flux components subtract from each other, a control winding connected in series circuit between said base electrode and one other electrode of said transistor, a resistive impedance connected between said base electrode and the third electrode of said transistor, said control winding being positioned in inductively coupled relationship to said rotor so that said rotor induces cyclic voltages in said control winding to cyclically bias said transistor to alternate conductive and non-conductive states.

4. Apparatus for supplying operating power from a source of unidirectional voltage to an alternating current motor having a rotor and first and second field coil windings comprising, a transistor, means connecting a first of said field windings directly across said unidirectional source of voltage to generate a first flux of component having a constant directed magnitude of +NI, means connecting a second of said field windings in series with said transistor and said unidirectional source of voltage to generate a second flux component having a cyclical directed magnitude varying from zero to −2NI, said first and second field windings being positioned so that said first and second flux components subtract from each other to produce a total flux varying from +NI to −NI, and a control winding positioned and connected to be responsive to the rotation of said rotor to cyclically bias said transistor to alternate conductive and non-conductive states.

5. Apparatus for supplying operating power from a source of unidirectional voltage to an alternating current motor having a rotor and first and second field coil windings comprising, switching means, means operatively responsive to the rotation of said rotor connected to cyclically actuate said switching means to alternate conductive and non-conductive states, means connecting a first of said field windings directly across said unidirectional source of voltage to generate a first flux component having a constant directed magnitude of +NI, means connecting a second of said field windings in series with said switching means and said unidirectional source of voltage to generate a second flux component having a cyclically variable directed magnitude which varies from zero to −2NI, said first and second field windings being positioned so that said first and second flux components subtract from each other to produce a total flux which varies from +NI to −NI.

6. Apparatus for supplying operating power from a source of unidirectional voltage to an alternating current motor having a rotor driven shaft and first and second field windings comprising, a transistor having emitter, base, and collector electrodes, means connecting a first of said field windings directly across said unidirectional source to generate a first flux component having a first direction, means connecting a second of said field windings in series circuit relationship with the emitter-collector circuit of said transistor and with said unidirectonal source of voltage to generate a second flux component having a second direction opposite to said first direction, said first and second field windings being positioned so that said first and second flux components subtract from each other, a shuttle of magnetizable material mounted for rotation by said shaft, a third winding connected directly across said source of unidirectional voltage and positioned in inductively coupled relationship with said shuttle, a fourth control winding connected in series circuit relation between said base electrode and one other electrode of said transistor, said control winding being positioned in inductively coupled relationship with said shuttle so that rotation of said shuttle induces cyclic voltages in said control winding to cyclically bias said transistor to alternate conductive and non-conductive states.

7. Apparatus for supplying operating power from a source of unidirectional voltage to an alternating current motor having a rotor driven shaft and first and second field coil windings comprising, a transistor, a shuttle of magnetizable material mounted for rotation by said shaft, an energizing coil connected directly across said source of unidirectional voltage and positioned in inductively coupled relationship with said shuttle, a control coil positioned in inductively coupled relationship with said shuttle and connected to cyclically bias said transistor to alternate conductive and non-conductive states when cyclic voltages are induced in said control coil by rotation of said shuttle, means connecting a first of said motor field windings directly across said unidirectional source of voltage to generate a first flux component having a constant directed magnitude of +NI, means connecting a second of said motor field windings in series circuit relationship with said transistor and said unidirectional source of voltage to generate a second flux component having a cyclically variable directed magnitude which varies from zero to −2NI, said first and second motor field windings being positioned so that said first and second flux components subtract from each other to produce a total flux which varies from +NI to −NI.

8. Apparatus for supplying operating power from a source of unidirectional voltage to a multiphase alternating current motor having a rotor and having first and second field coil windings associated with each phase comprising, a single transistor for each phase, means connecting a first of said field windings for each phase directly across said unidirectional source of voltage to generate a first flux component having a first direction, means connecting a second of said field windings of each phase in series with the transistor associated with that phase and said unidirectional source of voltage to generate a second flux component having a second direction opposite to said first direction, said first and second field windings of each phase being positioned so that said first and second flux components of that phase subtract from each other, a biasing control winding connected in circuit with the transistor of each phase, a shuttle of magnetizable material mounted for rotation by said rotor shaft, an energizing coil positioned in inductively coupled relationship with said shuttle and connected directly across said unidirectional source of voltage, each of said control windings being positioned in inductively coupled relationship with said shuttle to be responsive to the rotation of said shuttle to cyclically bias its associated transistor to alternate conductive and non-conductive states, said control winding being positioned in equi-angular relationship to each other.

9. An electric motor comprising a rotor, a multi-phase stator assembly comprising first and second field windings associated with each phase, switching means for each phase having a conducting and a non-conducting state, means for connecting a first of said field windings of each phase to a unidirectional source of voltage to generate a first flux component having a first direction, means connecting a second of said field windings of each phase to a unidirectional source of voltage under the control of the switching means for said phase to generate a second flux component having a second direction opposite to said first direction when said switching means is in one of its states, said first and second field windings of each phase being positioned so that the first and second flux components of that phase subtract from each other, and control means connected with the switching means of each phase and being operative to cyclically shift the respective switching means between their conductive and non-conductive states in phased relation to produce a multi-phase alternating magnetic field in the stator assembly for driving said rotor.

10. An electric motor system comprising a rotor, stator means having a number of phase positions and operatively associated with said rotor, said stator means comprising a series of first winding means and a series of second winding means at the respective phase positions and coupled with said rotor, means for supplying a steady direct current to each of said first winding means to generate respective first steady magnetic fields at the respective phase positions, a series of trigger means each controlling current flow to one of said second winding means and having a conducting and a non-conducting state, and means for cyclically and successively activating said trigger means to supply out of phase pulsating direct currents to the respective second winding means of amplitude and polarity to produce a resultant multi-phase alternating magnetic field pattern for driving said rotor.

References Cited in the file of this patent

UNITED STATES PATENTS 2,895,095        Guyton _____ July 14, 1959